Patented July 31, 1928.

1,678,713

UNITED STATES PATENT OFFICE.

HARRY STIRLING SNELL, OF CHICAGO, ILLINOIS, ASSIGNOR TO WESTERN ELECTRIC COMPANY, INCORPORATED, OF NEW YORK, N. Y., A CORPORATION OF NEW YORK.

MOLDING COMPOUND.

No Drawing. Application filed November 8, 1924. Serial No. 748,525.

This invention relates to molding compounds.

One object of the invention is to produce a hardened protein with great resistance to moisture suitable for use as a molding compound.

A further object of the invention is to produce an insoluble proteinate which may be hardened.

According to the main features of the invention, a protein, preferably casein, is dissolved in an aqueous solution of caustic soda to produce a solution of a water soluble caseinate. A water solution of a salt of an organic acid, preferably a solution of castile soap, may then be added to the aqueous caseinate solution and a solution of aluminum acetate is added to the resulting mixture. A double decomposition takes place and the insoluble constituents formed are precipitated out of solution. The precipitate consists of an intimate mixture of an insoluble caseinate and an insoluble soap specifically aluminum caseinate and aluminum oleate, where the preferred constituents are used. However, the salt of an organic acid may be omitted and the precipitant added to the solution of the caseinate alone.

This precipitated material may then be hardened with a suitable hardening agent, any of the aldehydes being usable for the purpose. Furfural, a substantially anhydrous aldehyde, may be combined with the precipitate to cause a condensation thereof, in the manner described in the copending application of S. M. Hull, Serial No. 719,742, filed June 13, 1924.

Other objects and features of the invention will be apparent from the following detailed description and will be particularly pointed out in the appended claims.

It is common practice to incorporate various proteins with materials such as formaldehyde, acetaldehyde or furfural to produce a hard, difficultly fusible and soluble condensation product. Although such condensation products are in general insoluble in water, they will absorb a great deal of moisture and sometimes swell considerably on that account. It has been proposed to incorporate various waterproofing materials with the casein before condensation thereof, but there is sometimes considerable difficulty in obtaining a proper mixture of the casein and the waterproofing material.

This difficulty may be overcome when it is desired to incorporate a waterproofing material with the condensation product resulting from the reaction of a hardening agent on the insoluble caseinate hereinbefore described by precipitating a waterproofing material and the insoluble caseinate in the presence of each other so as to obtain a more intimate mixture than is obtainable by other methods heretofore used. However, the condensation product obtained by the reaction of an insoluble caseinate and an aldehyde has sufficient water repellant properties to permit its use for many purposes without the addition of waterproofing agents. In the following description a method of producing a plastic composition is described in which a waterproofing agent is produced simultaneously with the production of one of the ingredients of the condensation product, but it is to be understood that the waterproofing agent is not an essential ingredient in the finished product.

In the production of compounds of this nature a great many different proteins either of vegetable origin such as zein or soy-bean casein or of animal origin, such as gelatine, milk casein and albumin may be employed. For the sake of clearness, however, hereinafter in this description the word "casein" will be employed to designate generally this type of compound.

The first step in the production of the improved composition is to obtain an aqueous solution of a soluble caseinate. Although considerable latitude exists, it is preferable to dissolve casein, preferably a high grade low acidity, low fat content casein, in an aqueous solution of caustic soda. Other materials which may be used in the same way as the caustic soda are any of the alkaline earth hydroxides, alkalies, borates, phosphates, sodium silicates, and the like. To the solution of soluble caseinate produced by the reaction which takes place is then added a solution of a salt of an organic acid, such as the sodium or potassium salts of linoleic, palmitic, stearic, oleic, or resin acids or mixtures of these. These two solutions being mixed together, a material capable of causing the production of an insoluble caseinate and an insoluble salt of an organic acid and the simultaneous precipitation of these compounds is added. Such precipitants may be alkaline earth, aluminum or zinc salts, and may be any metallic salt of a strong or weak acid or combinations of these. The weak acid salts, such as acetates, are preferable because if they are present in greater proportions than can unite chemically with the other constituents of the reactions and the excess be not afterwards washed out entirely, they do very little harm. If a strong acid, however, exists in a free state or in the form of a salt in the composition it forms a fairly good conductor for electricity and where the composition is used as a dielectric, this condition is undesirable.

When all of the constituents have been incorporated and precipitation has taken place, the precipitate is thoroughly washed and dried and can then be incorporated with any of the standard hardening agents such as aldehydes, which are generally used with casein to produce a hard condensation product. Such a hardening agent may be any aldehyde in sufficient proportions for hardening the casein. When a water soluble aldehyde is used it is possible to produce the precipitate in its presence. However, as suggested above the precipitated material may be dried first and mixed with a hardening agent and pressed or may be pressed and hardened afterwards. Examples of the aldehydes which may be used are furfural, acetaldehyde, formaldehyde or any reactive methylene compound.

The proportion of salt of an organic acid used will determine the degree of insolubility and water resistence, the hardness, the surface lustre and other characteristics of the final product. While the exact optimum percentages will differ depending upon the properties desired in the finished product, it is believed that salt of an organic acid in the proportions of from 1 to 10% of the casein present may be used advantageously. A greater amount of salt increases the insolubility, but decreases to a certain extent the hardness obtainable in the final product.

As an example of the process high grade casein having a low acidity and low fat content is dissolved to the extent of about 10% in an aqueous solution of caustic soda in which has been previously dissolved castile soap (sodium oleate) equivalent to about 5% of the weight of the casein. The solution, when complete, is warmed to about 45° C. and a 10% solution of aluminum acetate added while rapidly agitating the mixture. The precipitate in this case probably a mixture of aluminum caseinate and aluminum oleate is allowed to settle and the excess liquid drawn off. The precipitate is partially dried by whirling it in a centrifugal wringer and then washing once or twice with water to remove the electrolytes, in this case sodium acetate which is formed by double decomposition and possibly excess aluminum acetate. It is then wrung again after which it may be mixed with a filler such as clay, zinc oxide, mica, etc. by means of a pebble mill or a kneading machine.

The mixture may then be hardened in the usual manner by an aldehyde, preferably furfural. If furfural is used, it can be introduced in the liquid form about 1.5% being used, based on the weight of the casein. The mixture of aluminum caseinate and aluminum oleate should be thoroughly dried prior to mixing with furfural. An alternate arrangement is to add to the solution before the precipitation of the caseinate an aldehyde equivalent (in the case of formaldehyde) to about 4% of the weight of the casein.

A filler may be introduced into the liquid before precipitation so that if the agitation is sufficiently violent as to maintain the filler in suspension, the precipitant may be added and the precipitate formed with the particles of filler acting as condensation or precipitation neuclei. In this way a more perfect mixture of filler, caseinate and organic salt can be obtained than would be possible by mechanical means.

The heating of the solutions referred to above has the effect of causing an agglomeration of the precipitate so as to make it easier to handle. It has no effect on the reaction however, and the process may be carried on with all of the constituents at room temperatue.

By hardening or condensation of the casein by means of an aldehyde it is meant a chemical reaction takes place between the amino groups of the casein and the aldehyde, water being liberated and a new compound of greater molecular weight being formed. Such a compound is less soluble and absorbs less moisture than the original material.

What is claimed is:

1. As a new article of manufacture, a compound formed by the condensation of an insoluble proteinate and furfural.

2. As a new article of manufacture, a compound formed by the condensation of an insoluble caseinate and furfural.

3. As a new article of manufacture, a compound formed by the condensation of an insoluble metal proteinate and furfural.

4. As a new article of manufacture, a compound formed by the condensation of an insoluble metal caseinate and furfural.

5. As a new article of manufacture, a compound formed by the condensation of aluminum caseinate and an aldehyde.

6. As a new article of manufacture, a compound formed by the condensation of aluminum caseinate and furfural.

7. A method of producing a plastic composition, which consists in treating an insoluble proteinate with furfural to cause a condensation thereof.

8. A method of producing a plastic composition, which consists in treating an insoluble metal caseinate with furfural to cause a condensation thereof.

9. A method of producing a plastic composition, which consists in treating an insoluble metal caseinate with furfural to cause a condensation thereof.

10. A method of producing a plastic composition, which consists in treating aluminum caseinate with an aldehyde to cause a condensation thereof.

11. A method of producing a plastic composition, which consists in treating aluminum caseinate with furfural to cause a condensation thereof.

12. A method of producing a plastic composition, which consists in forming a solution of a soluble proteinate, adding to the solution a substance capable of precipitating an insoluble proteinate therefrom, and treating the precipitate with furfural.

13. A method of producing a plastic composition, which consists in forming a solution of a soluble caseinate, adding to the solution a substance capable of precipitating an insoluble caseinate therefrom, and treating the precipitate with furfural.

14. A method of producing a plastic composition, which consists in forming a solution of a soluble proteinate, adding a metal salt to the solution to precipitate a metal proteinate therefrom, and treating the precipitate with furfural.

15. A method of producing a plastic composition, which consists in forming a solution of a soluble caseinate, adding aluminum acetate to the solution to form a precipitate of aluminum caseinate, and treating the precipitate with furfural.

In witness whereof, I hereunto subscribe my name this 31st day of October A. D., 1924.

HARRY STIRLING SNELL.